April 26, 1960
L. L. MEYER ET AL
2,933,875
TOBACCO CUTTER
Filed March 6, 1957
5 Sheets-Sheet 2
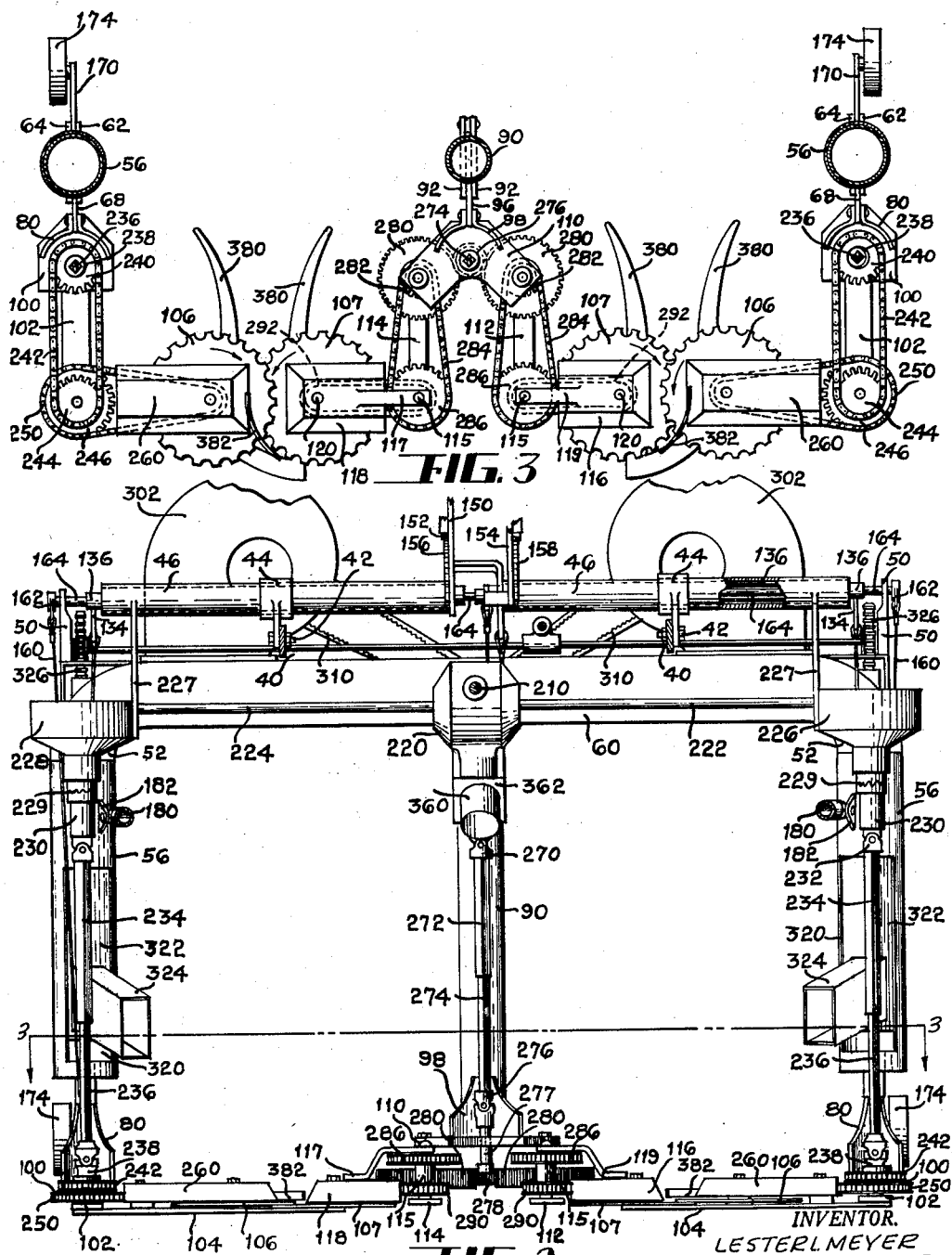
INVENTOR.
LESTER L. MEYER
ROBERT L. MEYER
BY
THEIR ATTORNEY April 26, 1960 L. L. MEYER ET AL 2,933,875
TOBACCO CUTTER
Filed March 6, 1957 5 Sheets-Sheet 3
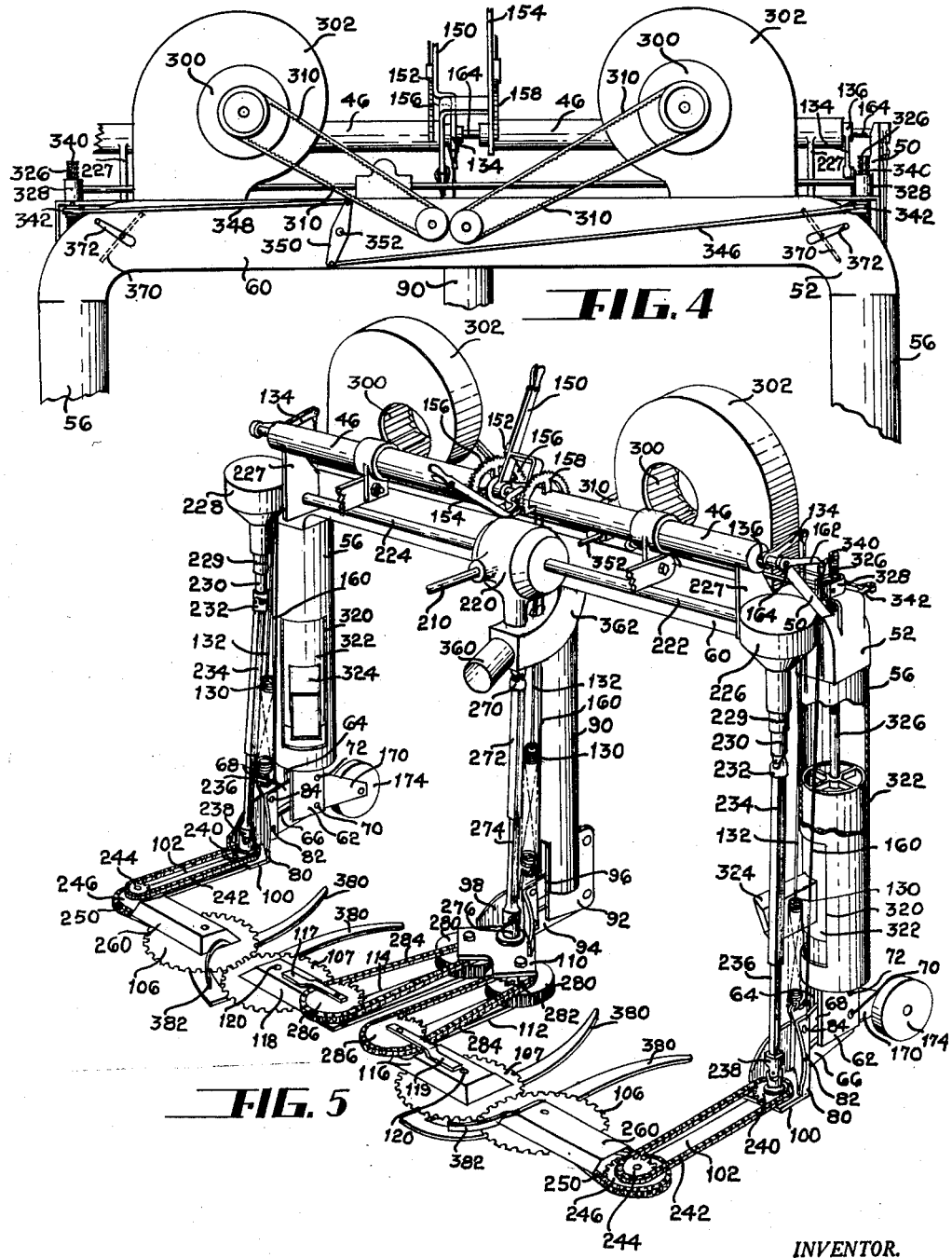
INVENTOR.
LESTER L. MEYER
ROBERT L. MEYER
BY
THEIR ATTORNEY

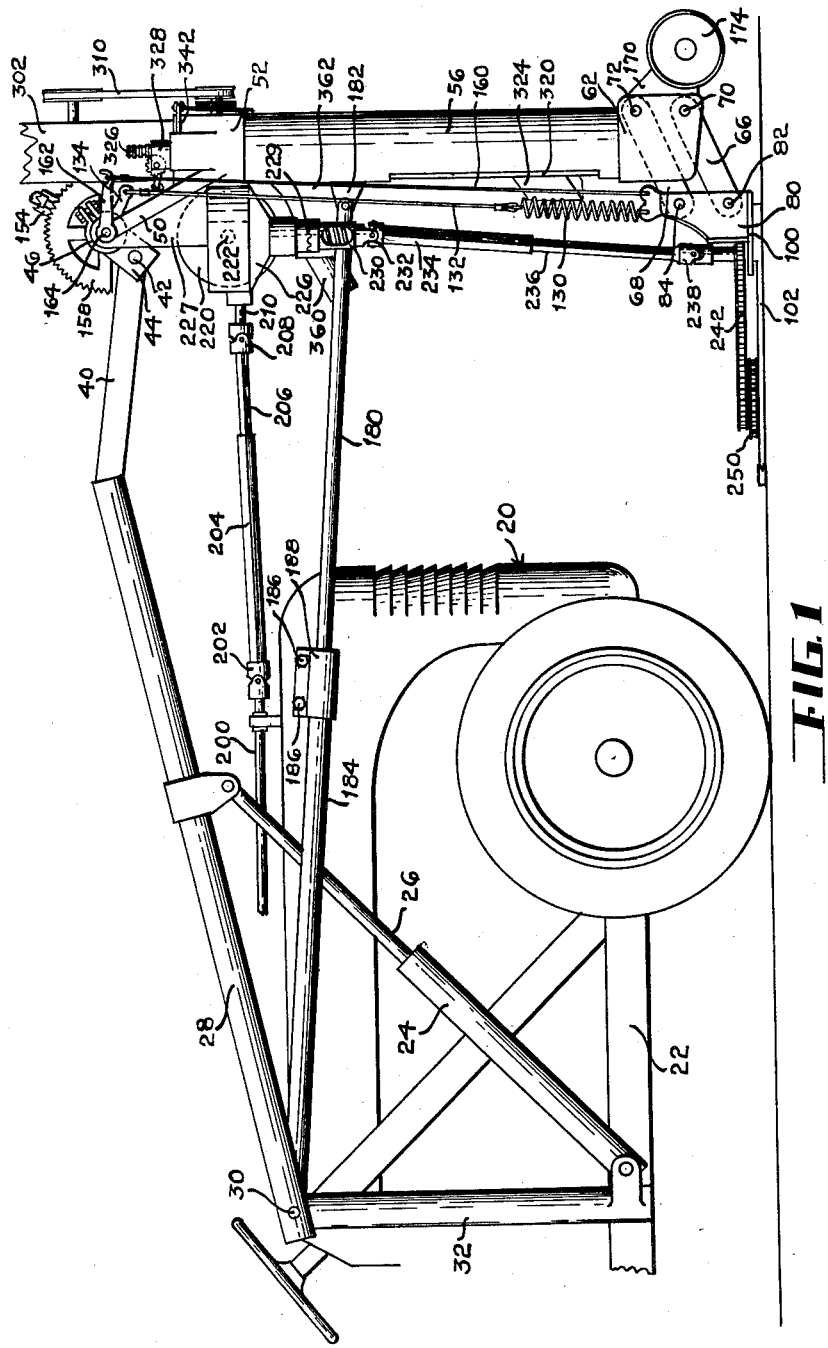

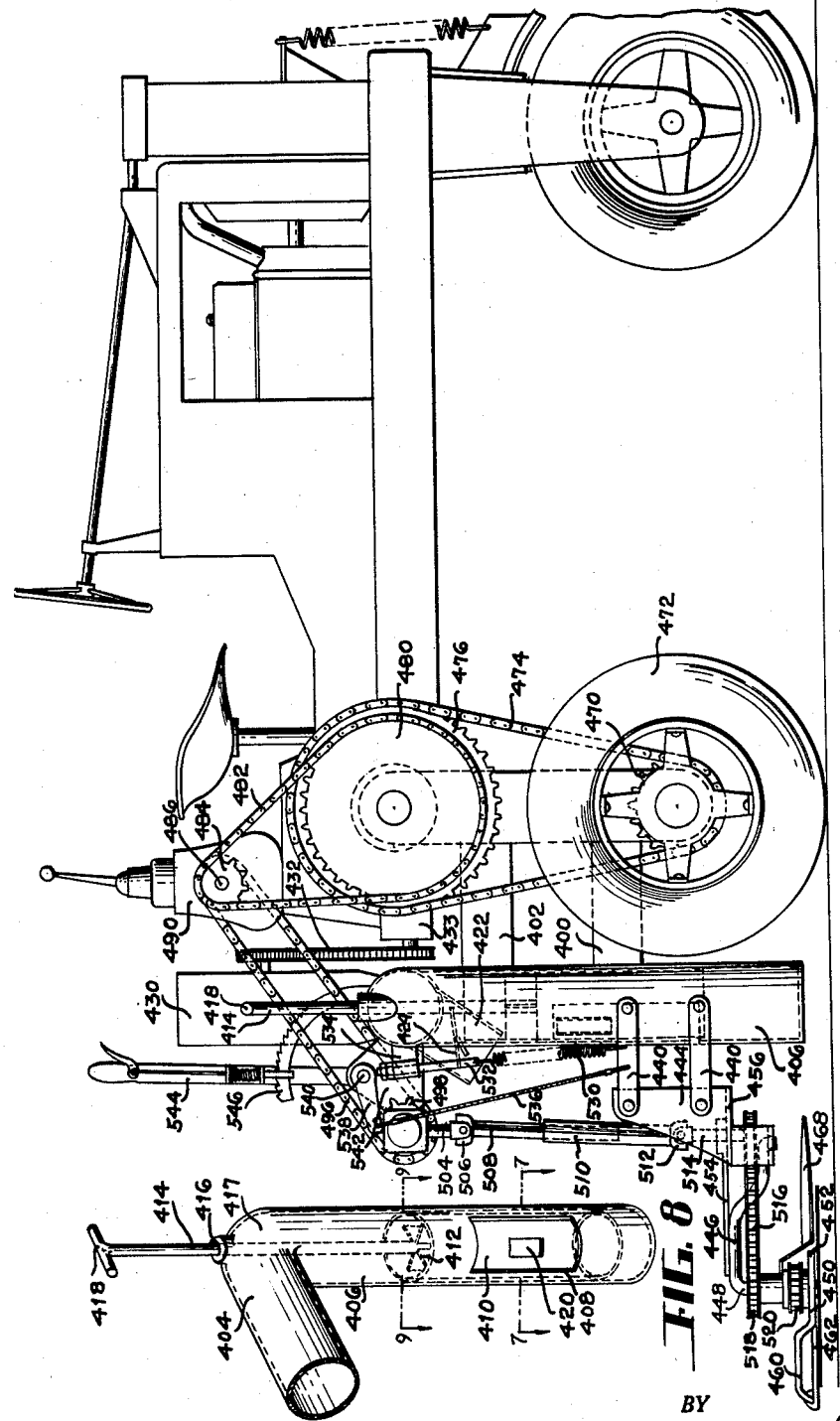

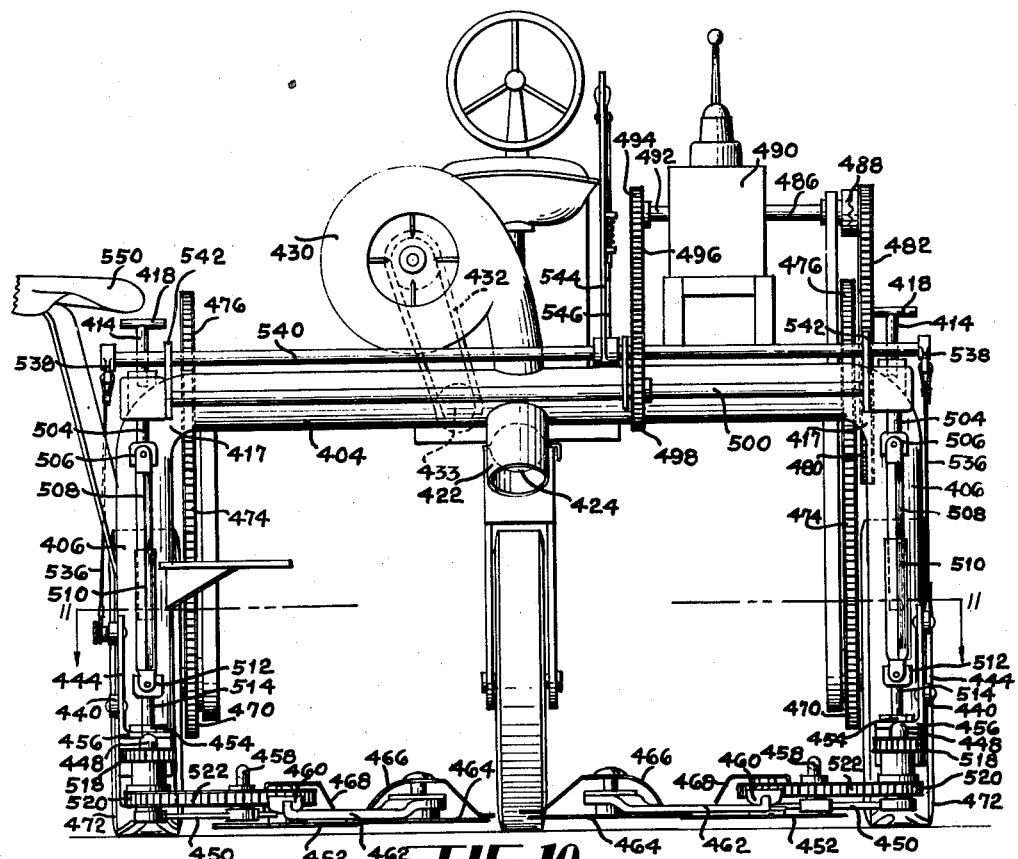

United States Patent Office 2,933,875
Patented Apr. 26, 1960

2,933,875
TOBACCO CUTTER

Lester L. Meyer and Robert L. Meyer, Arcanum, Ohio

Application March 6, 1957, Serial No. 644,311

15 Claims. (Cl. 56—27.5)

This invention relates to a machine for cutting row crops, such as tobacco plants which are planted in parallel rows, although this invention is not necessarily so limited.

In cutting or harvesting certain varieties of row crops, it is frequently desirable that the crops be harvested without mutilation. This is particularly the case with tobacco plants. Accordingly, machines for cutting such plants preferably have the characteristic that the plant is cut and laid upon the ground with a minimum of handling. Attempts have been made to use a reel for laying the plants down as they are cut, however, such attempts have met with only mediocre success for two reasons. First, the reel has a tendency to damage the tobacco leaves. Second, a reel adjusted to lay down tall plants will not reach the short plants and when the reel is adjusted to lay down short plants, the tall plants tend to whip around the reel and be carried by the reel rather than be laid down. Since tobacco plants growing in a row may be of various heights, the difficulties with such reels will be frequent.

An object of this invention is to provide a cutter for row crops such as tobacco, corn, and the like, wherein the cut material is laid down by blasts of air or blown down by means of a blower.

Another object of this invention is to provide in a tobacco cutter, cutting elements that are floatingly mounted, so as to be easily raised and lowered to accommodate irregularities in the ground and shiftable laterally to accommodate irregularities in the distance between the rows or the linearity of the rows.

Other objects and advantages reside in the construction of parts, the combination thereof, the method of manufacture and the mode of operation, as will become more apparent from the following description.

Figure 1 is a fragmentary side elevational view of the tobacco cutter, wherein the cutter is mounted ahead of the tractor or towing vehicle.

Figure 2 is a rear elevational view of the cutter removed from the tractor, the drive and support shafts extending from the tractor to the cutter being shown in cross-section.

Figure 3 is a fragmentary cross-sectional view taken substantially on the section line 3—3 of Figure 2.

Figure 4 is a fragmentary front elevational view of the blower drive mechanism and parts associated therewith.

Figure 5 is a perspective view of the cutter mechanism shown in Figure 1, with parts broken away.

Figure 6 is a side elevational view of a modified cutter mounted on the rear of a tractor.

Figure 7 is a cross-sectional view, taken substantially on the section line 7—7 of Figure 8.

Figure 8 is a perspective view of one of the air conduits used in the modification shown in Figure 6.

Figure 9 is a cross-sectional view, taken substantially on the section line 9—9 of Figure 8.

Figure 10 is a rear elevational view of the cutter shown in Figure 6.

Figure 11 is a cross-sectional view, taken substantially along the line 11—11 of Figure 10 disclosing the supporting assembly for the cutting discs.

Referring to the drawings, the reference numeral 20 indicates a tractor having a frame 22. Mounted on the frame 22 is a hydraulic lift mechanism including a cylinder 24, a piston rod 26 and a pivotally mounted lever member 28. The lever member 28 is pivoted at 30 to a standard 32 and is connected to a bar 40 pivotally attached at 42 to a bracket 44 fixedly mounted upon a tubular frame member 46. This mechanism is duplicated on the opposite side of the tractor.

A pair of arms 50 are fixedly attached to the tubular frame members 46 and extend downwardly and forwardly, as best seen in Figure 1, to engage hollow brackets or frame members 52. The frame members 52 are fixedly attached to rather large vertically disposed tubular frame members 56. As best seen in Figure 5, the two frame members 52, one on either end, are connected together by a horizontal tubular frame member 60. Referring to Figures 1 and 5, the lower ends of the tubular members 56 are connected to a pair of spaced plate members 62 and 64. A pair of links 66 and 68 project rearwardly from the plate members 62 and 64 and are pivotally mounted at 70 and 72 to the plate members 62 and 64. The links 66 and 68 always extend parallel to each other and are pivotally attached to a shoe 80 by means of pivots 82 and 84, there being one pair of links 66 and 68 and a shoe 80 for each tubular member 56.

As best seen in Figure 2, each shoe 80 includes a horizontal plate 100 having pivotally attached thereto, a rearwardly extending bar 102 connected to a transverse bar 104 supporting spaced serrated cutting discs 106 and 107, which are driven by a suitable drive mechanism to be described later. The margins of the cutting discs 106 and 107 overlap partially to provide a scissor-like cutting action.

A vertical tubular frame member 90 is attached to the horizontal frame member 60 at a central location and is provided with spaced plates 92 pivotally supporting a pair of parallel links 94 and 96 connecting to a shoe 98. The shoe 98 includes a horizontal plate member 110 pivotally supporting a pair of rearwardly extending bars 112 and 114. The rearward ends of the bars 112 and 114 support pintles 115, which among other things support brackets 117 and 119 engaging housing members 116 and 118, each provided with a bearing into which a pintle 120 supporting a cutting disc 107 is journalled.

By this arrangement, two cutting assemblies, each including a pair of cutting discs 106 and 107 are provided to the rear of the frame members 56 and 90. One cutting assembly is supported by pivotally mounted parallel bars 102 and 114 and the other cutting assembly is supported by pivotally mounted parallel bars 102 and 112. Accordingly, the cutting assemblies are free to move transversely of the direction of movement of the tractor while always remaining in an orientation normal to the direction of movement of the tractor.

As best seen in Figure 5, the bars 104 supporting the cutting assemblies have integral therewith horn-like guide elements 380 adapted to engage the stems of plants being cut and thereby draw the cutting assemblies into alignment with the plant for cutting the stem. Thus, although the plants may be planted in imperfect rows, the horn-like guides 380 will automatically adjust the cutting assemblies so that all plants within a row not unreasonably scattered will be cut. Deflecting arms 382 supported by the housing members 260 are used for moving the cut stems towards the center of the cutter so that, as will be described later, the plants are deposited between rows where they will not be mutilated by the tractor wheels.

The shoes 80 and 98 are, so to speak, floatingly mounted with respect to the tubular members 56 and 90, respectively. As may readily be seen by referring to Figures 1 and 5, the upper ends of the shoes 80 and 98 are connected by springs 130 to cables 132, each of which is connected to a link 134 connected to a tubular sleeve 136, there being two such sleeves journalled upon a shaft 164 extending coaxially within the tubular frame members 46. The center portions of the sleeves 136 are interconnected by means of a lever 150 provided with a pawl 152 engaging a ratchet wheel 156, secured to one frame member 46. The arrangement is such that as the lever is adjusted, the tension of the springs 130 is adjusted. The tension may be increased, for example, thereby requiring a lesser force to raise the shoes 80 and 98 and the parts attached thereto upwardly.

The upper ends of the shoes 80 and 98 are also connected by cables 160 to links 162 fixedly attached to the shaft 164 rotatably mounted in the tubular sleeves 136, the shaft 164 being adjusted by means of a lever 154 engaging a ratchet wheel 158 secured to one frame member 46. The shoes may be positioned positively by means of the lever 154 so as to limit the downward movement of the shoes with respect to the frame members 56 and 90. Thus, the cables 160 limit the downward movement of the shoes 80 and 98, but the shoes may be elevated upwardly independently of the cables 160 by means of the springs 130 and the cables 132.

By floatingly mounting the shoes 80 and 98 as described, the cutting assemblies carried thereby are permitted freedom of vertical motion such that they may follow the contour of the ground, riding over bumps and small mounds in the ground. This enables the cutting assemblies to be placed as close to the ground as possible, without damage thereto due to irregularities in the ground surface. Preferably, for cutting tobacco, the cutting assemblies are set to cut just at the ground level, or where the tobacco plants are hilled, to cut below the crest of the hills.

Each of the frame members 56 has been provided with a forwardly extending bracket 170 supporting a wheel 174 which may ride upon the surface of the ground to relieve the weight of the cutter assembly.

The entire assembly may be raised from the ground by supplying a hydraulic fluid to the cylinder 24, raising the lever member 28 upwardly. Telescoping rods 180 and 184, the latter pivotally secured to the tractor at 30 and the former pivotally attached to a bracket 182 fixedly attached to the tubular frame member 56 cooperate with the lever member 28 to support the entire structure. The telescoping rod assembly is duplicated in each side of the tractor. With this arrangement, the entire cutter may be raised several feet from the ground to enable safe movement of the cutter from one place to another or, when coming to the ends of rows, for turning the cutter and tractor around.

The combined length of the rods 180 and 184 may be adjusted by loosening bolts 186 in a coupling sleeve 188, mutually engaging the rods 180 and 184, so as to properly position the cutter in a vertical orientation.

The means for powering the cutter assemblies will now be described.

The cutter is powered from the power take-off of the tractor. This has not been shown, in that this is well known to those skilled in the art. As illustrated in Figure 1, the power take-off drives a shaft 200 attached to a coupling member 202 driving a square hollow shaft 204. A square shaft 206 telescopically engages the hollow shaft 204 and is connected to a universal joint 208 for driving a shaft 210, which in turn drives a differential, not shown, mounted in a housing 220 secured to the horizontal frame member 60. The output of the differential drives a pair of shafts 222 and 224 illustrated in Figure 5. The shafts 222 and 224 have pinions mounted on their outer ends for driving bevelled gears, not shown, mounted in housings 226 and 228 secured by brackets 227 to the frame members 46. The bevelled gears drive, through slip clutches 229, downwardly projecting shafts 230 connected by universal joints 232 to square hollow shafts 234 telescopically receiving square shafts 236. The telescopic arrangement of the square shafts 234 and 236 permits raising and lowering of the shoes 80 and the cutters carried thereby, so that the cutter members are driven irrespective of the elevation of the shoes 80.

The lower ends of the shafts 236 are connected to universal joints 238 drivingly connected to sprocket wheels 240 journalled to the shoes 80. The sprocket wheels 240 drive chains 242 trained over sprocket wheels 244 journalled to the transverse bar 104. Fixedly attached to the sprocket wheels 244 are sprocket wheels 246 which drive chains 250 passing over sprocket wheels, not shown, in housings 260, these sprocket wheels being fixedly connected to the cutting discs 106. The cutting discs 106 rotate in the direction of the arrows shown in Figure 3.

As best seen in Figure 2, the differential mounted in the housing 220 has a downwardly directed shaft, not shown, connected through a slip clutch to a universal joint 270, which drives a square hollow shaft 272 telescopically receiving a square shaft 274. The shaft 274 is connected to a universal joint 276 connected in turn by a stubshaft 277 to a pinion 278 meshing with gears 280 secured to the plate 110 of the shoe 98. These gears 280 have fixedly mounted thereto sprocket wheels 282. The sprocket wheels 282 drive chains 284 passing over sprocket wheels 286 connected to sprocket wheels 290, journalled upon the pintles 115, the sprocket wheels 290 driving chains 292 used in driving the cutting discs 107. The direction of rotation of the cutting discs 107 is indicated by the arrows on these cutter blades, illustrated in Figure 3.

The apparatus as described thus far is adapted to simultaneously cut two rows of plants. Ordinarily, the plants are planted in parallel rows, so spaced that the drive wheels of the tractor straddle two rows of plants. With a four wheeled tractor, where all wheels straddle two rows of plants, it is possible and preferable to cut the plants in front of the tractor for the reason that the tobacco plants are cut and laid down before the tractor straddles the rows and for the further reason that the driver can better control the cutting operation while steering the tractor. The tractor 20 of Figure 1 is such a tractor. To preclude mutilation of the cut plants, means which will now be described are employed for insuring that the cut plants fall between the cut rows thus insuring that the tractor wheels following the cutter will easily clear the cut plants.

Air blasts are supplied to the plants being cut by means of a pair of blower wheels 300, as shown in Figure 5, mounted in scrolls 302 communicating with the horizontal frame member 60, which in turn communicates with the tubular frame members 56. These tubular frame members 60 and 56 provide conduits for delivering air to preselected ports as will be described hereinafter. The blower wheels 300 are driven from the differential in the housing 220 by means of a pair of belts 310 as shown in Figure 4.

An air deflecting mechanism is mounted in each vertical tubular member 56, each member 56 being provided with an opening 320. As shown in Figure 5, each air deflecting mechanism includes a tubular sleeve 322 that is provided with a diagonally disposed duct 324 projecting through the opening 320. This tubular sleeve 322 is connected by a rod 326 to a nut 328 located above the frame member 52. By adjusting the nut 328, the tubular sleeve 322 may be raised or lowered, so as to raise or lower the duct 324. If the tobacco is very high, it may be raised. If the average height is quite low, it may be lowered.

As may best be seen by referring to Figure 4, the rod 326 is provided with a vertical groove 340. A bracket 342 is provided with a collar surrounding the rod 326 and is further provided with a key seated in the groove 340, so that the angular position of the rod 326 may be adjusted by adjusting the angular position of the bracket 342. This may be accomplished by means of rods 346 and 348 connected to a link 350 attached to a rod 352, which has been broken away for the sake of clearness, but which extends to the tractor, so that the operator can adjust the angular position of the sleeves 322 in the tubular members 56 in unison.

As may be readily seen by referring to Figure 5, the ducts 324 direct an air blast at approximately a 40° angle with respect to the direction of travel of the tractor and the cutter. This blast of air causes the cut stalks to drop between the two rows. In order to aid these diagonally disposed air blasts in laying down the cut stalks, a rearwardly and downwardly directed air blast is supplied from a duct 360 connected by a conduit 362 to an opening in the lower side of the tubular member or frame member 60.

The ducts 360 and 324 cooperate to lay the cut plants in a herringbone pattern between the cut rows. This herringbone array, in addition to saving the plants from mutilation by the wheels of the tractor, also aids materially in subsequent handling of the cut plants. That is, the plants may later be picked up for drying or other processing by grasping the outwardly projecting stems without damage to the leaves.

At times there may be a side wind, which necessitates a larger blast of air from one of the ducts 324 with respect to the blast of air from the other duct 324. The air blasts may be altered by dampers 370, shown in dotted lines in Figure 4, connected to adjustable levers 372. By this arrangement, the relative amount of air flowing through the ducts 324 may be adjusted to meet the requirements imposed by the wind currents at any particular time.

The preferred embodiment that has been described has been mounted ahead of the tractor. This is the preferred method of mounting the cutter in the event the tractor has two front wheels that are spaced equally as far apart as the rear wheels of the tractor, so that the tractor can straddle the two rows. By this arrangement, the tobacco is cut and deposited between the rows so that the tractor passes over the cut tobacco.

In the event a three wheeled tractor is to be used, the cutter members cannot then be located ahead of the tractor, in that the center wheel would pass directly over the cut tobacco and very seriously damage the crop. That being the case, the cutter must then be located to the rear of the tractor. This has been done in the modification disclosed in Figures 6 to 11 inclusive. Although this modification has been designed especially for use with a three wheeled tractor, it will become apparent that it may be used equally well with a four wheeled tractor.

Referring to Figure 6, it can readily be seen that a pair of braces 400 and 402 are used in attaching the cutter frame to the tractor frame. The main frame of the cutter, as shown in Figure 10, includes a horizontal tubular conduit 404 and a pair of vertical conduits 406, one for either end of the tubular conduit 404. Each conduit 406 has been provided with openings 408 as illustrated in Figure 8. An air blast controlling mechanism is mounted within each vertical conduit 406 and consists of a tubular sleeve 410 connected as shown in Figures 8 and 9 by transverse brackets 412 to a vertically disposed adjusting rod 414 passing through an aperture 416 in an elbow 417 joining member 404 to member 406.

This rod 414 is frictionally held in position and may be adjusted upwardly or downwardly, or rotated by a hand grip 418. The sleeve member 410 is provided with an aperture 420 through which the air escapes. The lower end of the tubular sleeve 410 is sealed. A vertical air blast is provided from the conduit 404 by a duct 422 regulated by a manually operable baffle 424.

A scroll 430, enclosing a blower wheel, is used in supplying an air current to lay each plant down after it has been cut. This blower wheel is driven by means of a chain 432 from the power output of the tractor, illustrated at 433.

As illustrated in Figure 6, an auxiliary frame for the cutter includes a pair of links 440 connected to the outer side of each tubular conduit 406. The rearwardly projecting ends of the links 440 are connected to a shoe 444, the lower end of which has pivotally mounted therein a shaft 446 provided with a vertical portion 448 supporting a transverse bar 450, best seen in Figure 10, to which is journalled a cutting disc 452. Each shaft 446 is suspended substantially horizontally by a bracket 454 engaging a base plate 456 in the supporting shoe 444.

As best seen in Figure 11, a lug 457, anchored to each shoe 444 and extending transversely therefrom, supports an arm 458 extending parallel to the shaft 446 and provided with a vertical portion journalled in the transverse bar 450. In this manner, each transverse bar 450 is pivotally secured to a shoe 444, such that the transverse bar 450 may execute transverse motion while remaining always in an orientation substantially normal to the direction of movement of the tractor.

Each transverse bar 450 supports a rearwardly extending lug 460 which engages and supports an arcuate arm 462 to which is secured a serrated cutting disc 464 engaging in overlapping relation the serrated cutting disc 452 secured to the transverse bar 450. Horn-like guide elements 466 and 468 are secured to the arm 462 and the transverse bar 450, respectively, for guiding the cutting discs 452 and 464 into cutting engagement with the stems of plants.

The driving mechanism for the cutting discs will now be described. As may best be seen by referring to Figure 6, a sprocket wheel 470 is mounted for rotation with the drive wheel 472 of the tractor, a chain 474 is driven by the sprocket wheel 470 and drives a sprocket wheel 476 journalled to the frame of the tractor. The sprocket wheel 476 is fixedly attached to a sprocket wheel 480 driving a chain 482 used in driving a sprocket pinion 484 fixedly mounted upon a shaft 486 connected to a clutch mechanism 490 which supplies power from the engine of the tractor to the drive wheels of the tractor. A slip clutch 488 is interposed between the sprocket pinion 484 and the shaft 486. Projecting from the clutch mechanism 490, as viewed in Figure 10, is a shaft 492 supporting a sprocket wheel 494 driving a chain 496 used in driving a sprocket wheel 498 keyed to a shaft 500. The outer ends of the shaft 500 have fixedly mounted thereon, beveled gears, not shown. These beveled gears mesh with other beveled gears fixedly attached to vertical shafts 504. These shafts 504 are connected by universal joints 506 to square shafts 508 telescopically mounted in square tubular members 510, the shafts 508 and tubular members 510 cooperating to provide telescopic drive shafts. These telescopic drive shafts are connected by universal joints 512 to shafts 514 journalled in the shoes 444 and having mounted thereon sprocket wheels for driving chains 516. The chains 516 are used in driving sprocket wheels 518 journalled upon the vertical portions 448 of the rearwardly extending shafts 446. The sprocket wheels 518 are fixedly attached to sprocket wheels 520 driving chains 522 which, in turn, drive sprocket wheels journalled in common with the cutting discs 452 to the transverse bars 450.

In this manner, mechanical rotation is transmitted from the tractor to the cutting discs 452. The cutting discs 464, cooperating with the cutting discs 452 to cut the steams of plants, are not driven mechanically but rather rotate randomly as the stems of plants are engaged by the cutting discs.

The shoes 444 are each floatingly mounted by means of springs 530, shown in Figure 6, connected to adjustable links 532 secured by brackets 534 to the transverse conduit or frame member 404. The maximum downward pivotal movement of the shoes 444 is limited by means of the cable 536 engaging an arm 538 secured to a shaft 540 journalled in a bracket 542 fixedly secured to the tubular frame member 404, the shaft 540 being selectively rotatable by means of a lever 544 engaging a ratchet segment 546. The lower limit of downward travel of the shoes 444, and as a consequence, the cutting assemblies carried by the shoes 444, is adjustable by means of a lever 544, so that the cutting discs 452 and 464 may be caused to cut plants at the desired elevation, which may be, for example, directly at ground level.

It is apparent that the cutting assembly of Figures 6 to 11 as described herein, is capable of simultaneously cutting two rows of plants, the separate cutting assemblies for each row being capable of automatically adjusting for variation in the linearity of the rows.

As the plants are cut, suitable air blasts are provided for laying the plants in a herringbone pattern between the cut rows to preclude mutilation by the wheels of the tractor carrying the cutter. Clearly, the operating characteristics of Figures 6 to 11 are in general, similar to those of the preferred embodiment, this modification being designed particularly for attachment to the rear of a three wheeled tractor, but also suitable for attachment to the rear of a four wheeled tractor.

An auxiliary seat 550 has been provided on one side of the frame structure of the cutter in this modification. A helper may use this seat to drop laths at spaced intervals as the tobacco plants are cut, these laths being used in spudding the tobacco stems, that is, in piercing the tobacco plant stems with the laths so that the plants may be conveniently hung for drying. By distributing the laths in this manner, it is possible to save a considerable amount of time in spudding the tobacco.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention we claim:

1. A plant cutter attachable to a motive vehicle provided with a source of power for driving the cutter, said cutter comprising, in combination, frame means adapted to be carried by said vehicle, a shoe pivotally secured to said frame means so as to pivot substantially in a vertical plane, said shoe being disposed adjacent the surface upon which said vehicle rests, means engaged with said shoe limiting the downward pivotal movement thereof relative to said frame means, spring means coacting between said shoe and said frame means urging said shoe upwardly, cutter means for cutting plants, supporting means securing said cutter means to said shoe in spaced relation thereto and substantially coplanar therewith, and drive means attached to said cutter means for transmitting power thereto from the source of power on said vehicle.

2. The plant cutter according to claim 1 wherein the means securing said cutter means to said shoe pivotally engages said shoe so as to permit pivotal movement of said cutter means relative to said shoe, and including guide elements projecting from said cutter means to engage the stems of plants to be cut and to thereby guide said cutter means toward the plants.

3. The plant cutter according to claim 1 wherein said cutter means includes a pair of horizontally disposed serrated cutting discs rotatably supported in spaced relation with the margins thereof overlapping by said supporting means, and wherein said drive means includes a vertically oriented telescopic drive shaft journalled at one end in said shoe and supported at the other end by said frame means, means transmitting mechanical rotation from said drive shaft to one of said serrated cutting discs, and means connected to the drive shaft for transmitting mechanical rotation from the source of power on said vehicle to said drive shaft.

4. The plant cutter according to claim 1 including hydraulic piston means operatively associated with said frame means for elevating said frame means and the elements supported thereby relative to said vehicle.

5. The plant cutter according to claim 1 wherein said frame means comprises a hollow conduit, and including blower means communicating with said conduit and means connected to said blower means for transmitting power from the source of power on said vehicle to said blower means so as to operate said blower means to direct an air stream into said conduit, said conduit being provided with a plurality of openings located so as to direct said air stream upon the plants cut by said cutting means to fell said plants in a predetermined direction.

6. A plant cutter attachable to a motive vehicle comprising, in combination, frame means adapted for attachment to said vehicle, said frame means including a horizontal portion elevated from the surface upon which said vehicle rests, and spaced vertical portions disposed to either side of said vehicle, a pair of shoes, there being one shoe disposed adjacent the lower end of each vertical portion, a link pivotally connecting each said shoe to the adjacent vertical portion of said frame means such that said shoe is movable in a vertical direction relative to said frame means, cable means coacting between each said shoe and said frame means limiting the downward movement of said shoe relative to said frame means, spring means coacting between said shoe and said frame means urging said shoe upwardly in opposition to gravitational forces, a pair of cutting assemblies, there being one cutting assembly disposed in spaced relation to each shoe, means pivotally connecting each said cutting assembly to the adjacent shoe, each said cutting assembly comprising a support assembly, a pair of horizontal cutting discs journalled in spaced relation for rotation in said support assembly, the margins of said discs engaging in overlapping relation, said support assembly including arcuate guide elements for engaging the stems of plants to be cut to draw the overlapping cutting discs into alignment with said stems, and drive means coupled to both cutting assemblies for transmitting mechanical rotation from a source of power operatively associated with the cutter to said cutting assemblies.

7. The plant cutter according to claim 6 wherein said drive means includes a shaft, bracket means supporting said shaft for rotation in spaced parallel relation to the horizontal portion of said frame means, means engaged with the shaft for transmitting mechanical rotation from the source of power to said shaft, sprocket means journalled for rotation in each said shoe, means including a vertically oriented telescopic drive shaft transmitting mechanical rotation from each end of said shaft to each said sprocket means, and chain and sprocket means transmitting mechanical rotation from each said sprocket means to one cutting disc of each said cutting assembly.

8. The plant cutter according to claim 6 wherein said frame means includes a third vertical portion midway between the first vertical portions, said cutter additionally including a third shoe positioned adjacent the lower end of and in spaced relation to said third vertical portion, a link pivotally connecting said third shoe to said third vertical portion, cable means coacting between said frame means and said shoe limiting the downward movement of said shoe, spring means coacting between said frame means and said third shoe urging said shoe upwardly in opposition to the force of gravity, shafts pivotally connecting each said cutting assembly to said third shoe, and wherein said drive means includes a differential unit supported by said frame means, said differential unit including oppositely directed horizontal shafts extending substantially to the ends of the horizontal portion of said frame means and a vertically downwardly extending shaft, means coupled with said differential unit for transmitting mechanical rotation from the source of power to said differential unit whereby the shafts thereof are caused to rotate, sprocket members journalled for rotation in each said shoe, means including telescopic drive shafts transmitting mechanical rotation from the shafts of said differential unit to the sprocket members journalled in said shoes, there being one drive shaft for each sprocket member connecting to one of the shafts of said differential unit, and chain means engaging the sprocket members for transmitting mechanical rotation thereof to said cutting discs.

9. The plant cutter according to claim 6 wherein the horizontal and vertical portions of said frame means are tubular so as to provide an air conduit, said cutter including blower means mounted on said frame means for supplying an air current to said air conduit, means attached to said blower means for transmitting mechanical rotation thereto from a source of power operatively associated with said blower means, said frame means having openings in the vertical portions thereof, sleeve elements journalled for sliding movement in the vertical portions of said frame means and provided with ducts projecting outwardly through the openings of said frame means for directing the air stream flowing therethrough, and means connected to said sleeves and engaging said frame means for adjusting the elevation and the angular position of said sleeve to control the direction of air flow through the openings in said frame means.

10. The plant cutter according to claim 6 including means operatively associated with said cable means for adjusting said cable means so as to adjust the elevation of said shoes, and means operatively associated with said spring means for adjusting said spring means so as to adjust the force urging said shoes upwardly.

11. In an attachment for a tractor for cutting tobacco plants and the like, a tubular frame attachable to said tractor, a cutter supported by said frame for cutting plants, a blower mounted on said frame for driving an air current through said frame, said frame having first and second openings therein, means supported in said frame for directing a portion of said air current through said first opening downwardly and rearwardly of said cutter and means supported in said frame for directing a portion of said air current through said second opening diagonally and rearwardly over said cutter to fell the plants cut by said cutter in a predetermined direction relative to said cutter.

12. The attachment according to claim 11, including baffle means disposed in said tubular frame for adjusting the air current through at least one of said openings.

13. The attachment according to claim 11, wherein the means for directing a portion of said air current through said second opening includes an apertured sleeve slidably mounted in said frame and defining an air passage through said second opening, and means carried by said sleeve and engaging said frame for sliding said sleeve in said frame to adjust the position of said aperture relative to said second opening to thereby adjust the direction and elevation of the air current passing through said second opening.

14. In a plant cutter attachable to a motive vehicle, a frame adapted to be carried by the vehicle, a shoe pivotally secured to the frame for pivotal movement substantially in a vertical plane adjacent the surface upon which the vehicle rests, means engaged with said shoe limiting the downward pivotal movement thereof relative to the frame, spring means interconnecting the shoe and the frame urging the shoe upwardly, cutter means for cutting plants, and supporting means securing the cutter means to the shoe in spaced relation thereto.

15. In a plant cutter, the structure according to claim 14 wherein the cutter means includes a pair of cutting discs, means rotatably supporting said cutting discs in adjacent positions with their margins overlapping, and guide means carried by said last named means for guiding the plants to be cut toward said cutting discs.

References Cited in the file of this patent
UNITED STATES PATENTS

| | | |
|---|---|---|
| 859,602 | Green | July 9, 1907 |
| 2,522,308 | Silva | Sept. 12, 1950 |
| 2,619,994 | Lower | Dec. 2, 1952 |
| 2,670,586 | Phillips | Mar. 2, 1954 |
| 2,710,516 | Kaesemeyer et al. | June 14, 1955 |
| 2,734,331 | Phillips | Feb. 14, 1956 |
| 2,780,046 | Edwards | Feb. 5, 1957 |